United States Patent [19]
Machida et al.

[11] Patent Number: 5,455,097
[45] Date of Patent: Oct. 3, 1995

[54] HONEYCOMB STUCTURAL BODIES

[75] Inventors: Minoru Machida, Nagoya; Masaomi Kamiya, Chiryu; Toshio Yamada, Nagoya, all of Japan

[73] Assignee: NGK Insulators, LTD., Japan

[21] Appl. No.: 212,803

[22] Filed: Mar. 15, 1994

[30] Foreign Application Priority Data

Mar. 31, 1993 [JP] Japan .................................. 5-074378

[51] Int. Cl.$^6$ ........................................................ B32B 3/12
[52] U.S. Cl. ........................................... 428/116; 428/188
[58] Field of Search ..................................... 428/116, 188, 428/118; 502/527; 264/177.12; 52/806

[56] References Cited

U.S. PATENT DOCUMENTS

| | | | |
|---|---|---|---|
| 3,112,184 | 11/1963 | Hollenbach | 428/116 X |
| 3,888,531 | 6/1975 | Straza et al. | 428/116 X |
| 3,890,108 | 6/1975 | Welsh | 428/116 X |
| 4,233,351 | 11/1980 | Okumura et al. | 428/116 X |
| 4,448,833 | 5/1984 | Yamaguchi et al. | 428/116 |
| 4,578,303 | 3/1986 | Kundinger et al. | 428/116 |
| 4,777,070 | 10/1988 | Huvey | 428/116 |
| 4,840,827 | 6/1989 | Mizutani et al. | 428/116 |
| 5,083,426 | 1/1992 | Layland | 428/116 X |
| 5,108,685 | 4/1992 | Kragle | 264/177.12 |
| 5,273,692 | 12/1993 | Numoto et al. | 264/177.12 X |
| 5,393,587 | 2/1995 | Machida et al. | 428/116 |

FOREIGN PATENT DOCUMENTS

| | | |
|---|---|---|
| 4236893 | 5/1993 | Germany. |
| 52-78965 | 7/1977 | Japan ..................................... 428/116 |

*Primary Examiner*—Henry F. Epstein
*Attorney, Agent, or Firm*—Parkhurst, Wendel & Rossi

[57] ABSTRACT

A honeycomb structural body including an outermost peripheral wall, and partition walls axially defining a number of through holes inside the outermost peripheral wall. The honeycomb structural body is bent around at least one line located orthogonally to an extending direction of the through holes, wherein $L1/L2 \geq 0.8$, and $R \geq 100$ mm, in which L1 is an axial length of a longest through hole among through holes located in an outer portion of the honeycomb structural body, L2 is an axial length of a shortest through hole among through holes located in an inner portion of the honeycomb structural body, and R is a radius of curvature of a center line of the honeycomb structural body defined by continuously connecting centroids of said outermost peripheral wall of the honeycomb structural body in respective planes orthogonal to the extending direction of the through holes thereof. The outer and inner portions of the honeycomb structural body are located outside and inside a plane, respectively, passing the center line of the honeycomb structural body and always extending in parallel to the at least one line around which the honeycomb structural body is bent.

11 Claims, 12 Drawing Sheets

FIG_1

FIG._2

FIG_3

FIG_4

FIG_5

FIG_7a
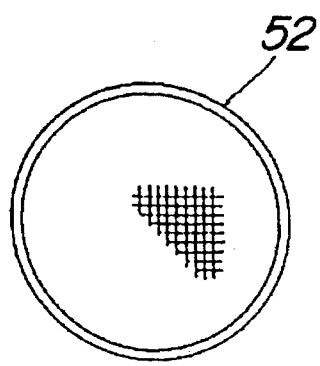
FIG_7b
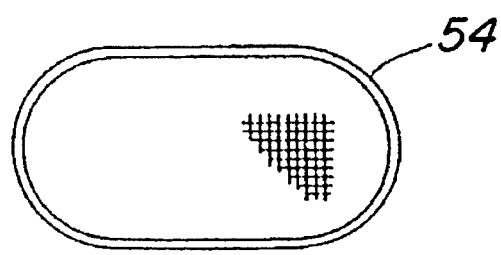
FIG_7c
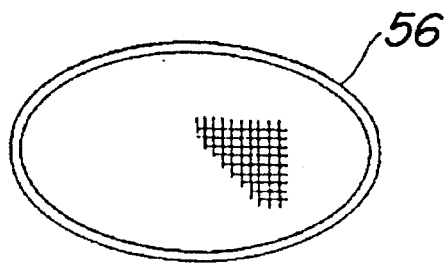
FIG_7d
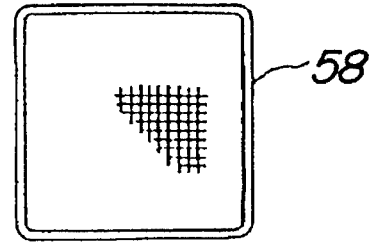
FIG_7e
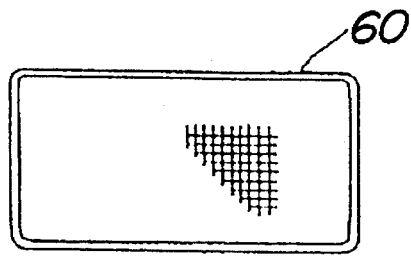
FIG_7f
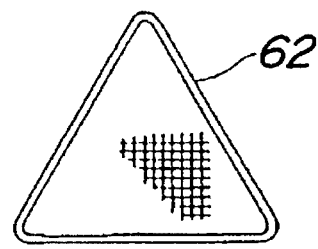

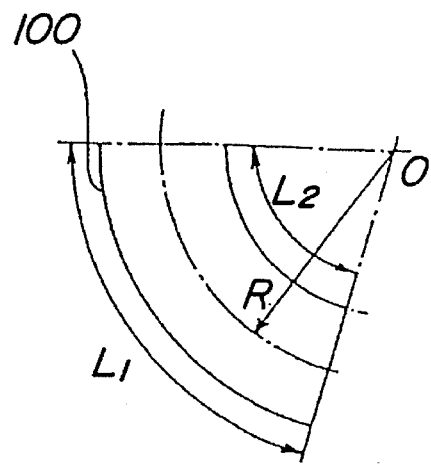
FIG_8a
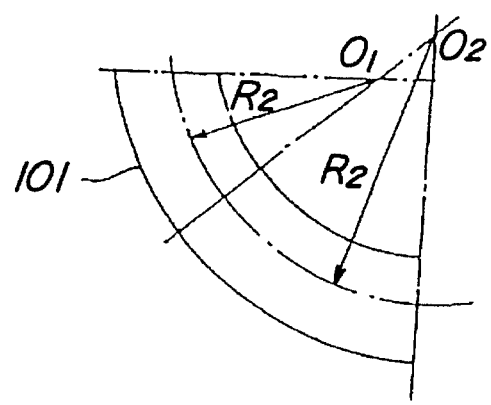
FIG_8b
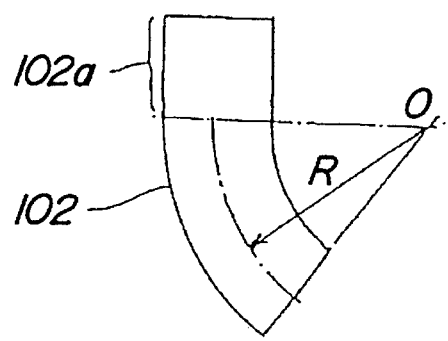
FIG_8c
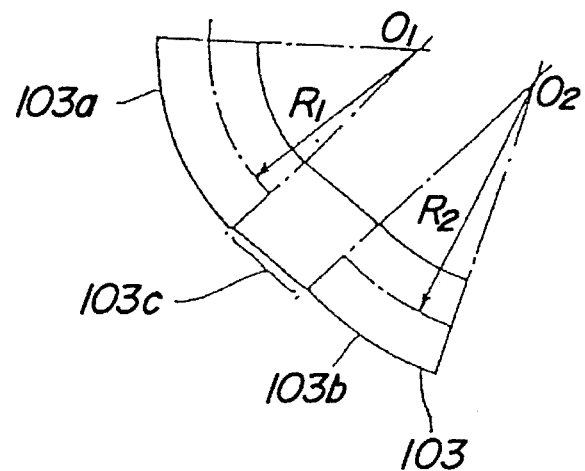
FIG_8d

HONEYCOMB STUCTURAL BODIES

BACKGROUND OF THE INVENTION

1. Field of the Invention

The present invention relates to curved honeycomb structural bodies.

2. Related Art Statement

Heretofore, honeycomb structural bodies have been produced by extrusion, or by corrugating a sheet and coiling it together with a flat sheet in a rolled fashion, or by forming a number of small projections in a metallic sheet in a scattered state through pressing and coiling it in a rolled fashion. These honeycomb structural bodies have a number of straight-line through holes.

When the conventional honeycomb structural bodies are used as catalyst carriers for the purification of exhaust gases from internal combustion engines in automobiles, there occur the following problems.

① Since there is a limitation on a fitting site, it is impossible to install the catalyst carrier in a location having an optimum temperature condition as considered from the standpoint of high temperature durability and purification efficiency of the catalyst.

② Since the flow rate of the exhaust gas at the outer peripheral portion of the honeycomb structural body is smaller than that at the central portion thereof, a majority of the exhaust gas is purified in the central portion of the catalyst. Therefore, it cannot be said that the outer peripheral portion of the honeycomb structural body fully functions as the catalyst, which means poorer purification performance for the same volume of the catalyst.

SUMMARY OF THE INVENTION

It is an object of the present invention to satisfy recent demands for the honeycomb structural bodies, and to provide catalyst-carrying honeycomb structural bodies having excellent purification efficiency of exhaust gases, which can be each arranged in a free location in a narrow space inside an engine room.

In order to accomplish the above object, the honeycomb structural body according to the present invention is characterized by a honeycomb structural body including an outermost peripheral shell or wall, and partition walls by which a number of through holes extending in an axial direction of the honeycomb structural body are defined inside the outermost peripheral wall. The honeycomb structural body is bent around at least one line located in a direction orthogonal to an extending direction of said through holes being perpendicular to a plane passing a center line of the honeycomb structural body. The center line being defined by continuously connecting centroids of said outermost peripheral wall of the honeycomb structural body in respective planes orthogonal to the extending direction of the through holes thereof. In the honeycomb structural body $L1/L2$ is no less than 0.8, and R is not less than 100 mm, in which $L1$ is an axial length of a longest through hole among through holes located in an outer portion of the honeycomb structural body, $L2$ is an axial length of a shortest through hole among through holes located in an inner portion of the honeycomb structural body, and R is a radius of curvature of said center line of the honeycomb structural body. The outer and inner portions of the honeycomb structural body are located outside and inside a plane, respectively, said plane passing said center line of the honeycomb structural body and always extending in parallel to said at least one line around which the honeycomb structural body is bent. The axial length of the through hole is a length of the through hole measured along a longitudinal central axis.

Since the honeycomb structural body of the present invention is bent, the honeycomb structural body can be mounted in a narrow space on fitting, which enlarges fitting latitude. Since the flow rate of the exhaust gases increases in a portion of the honeycomb structural body positioned on an outer peripheral side as viewed in a curved direction, the exhaust gases fully contact the catalyst to enhance the purification efficiency of the exhaust gases in the outer peripheral side of the honeycomb structural body as viewed in the curved direction.

When the ratio of $L1/L2$ is not less than 0.8 as defined above, the purification performance for the exhaust gases is improved. Particularly, it was found out that when the $L1/L2$ ratio is not less than 1.2, the exhaust gas purification performance is largely improved.

When the radius R of curvature of the honeycomb structural body is not less than 100 mm as recited above, pressure loss of the honeycomb structural body does not almost increase as compared with the conventional ones, which does not lead to deterioration in the engine performance such as reduction in outputs of the engine.

According to the honeycomb structural bodies of the present invention, the following are preferred.

① The center line possess at least two different radii R of curvature. The centers of curves bent at such at least two radii of curvature may be located on the same side as viewed relative to the plane passing the center line of the honeycomb structural body, or may be located on different sides.

② The honeycomb structural body includes a straightline portion in which said through holes are not bent is provided at least one location at an end portion of the honeycomb structural body or at a portion other than said end portion.

③ The honeycomb structural body is made of a ceramic material.

④ A catalyst is carried onto inner walls defining the through holes.

⑤ The partition walls extend in orthogonal directions as viewed in section at right angles to said extending direction of said through holes, thereby defining two orthogonal axes as viewed in section, and said at least one line is parallel to one of said two orthogonal axes.

⑥ The sectional shape of the honeycomb structural body as viewed in section orthogonal to said extending direction of the through holes is one selecting from the group consisting of a circular shape, an elliptical shape, an oval shape, a square shape, a rectangular shape and triangular shape.

These and other objects, features and advantages of the invention will be appreciated by the skilled person in the art to which the invention pertains, when taken in conjunction with the attached drawings.

BRIEF DESCRIPTION OF THE DRAWINGS

For a better understanding of the invention, reference is made to the attached drawings, wherein:

FIGS. 7(a) through 7(f) are sectional views for schematically illustrating variations of outermost peripheral walls of the honeycomb structural bodies according to the present invention;

FIGS. 8(a) through 8(d) are schematic views for illustrating variations of the shapes of the honeycomb structural bodies according to the present invention;

DETAILED DESCRIPTION OF THE INVENTION

The present invention will be explained in more detail with reference to embodiments shown in the attached drawings.

Figure 1:
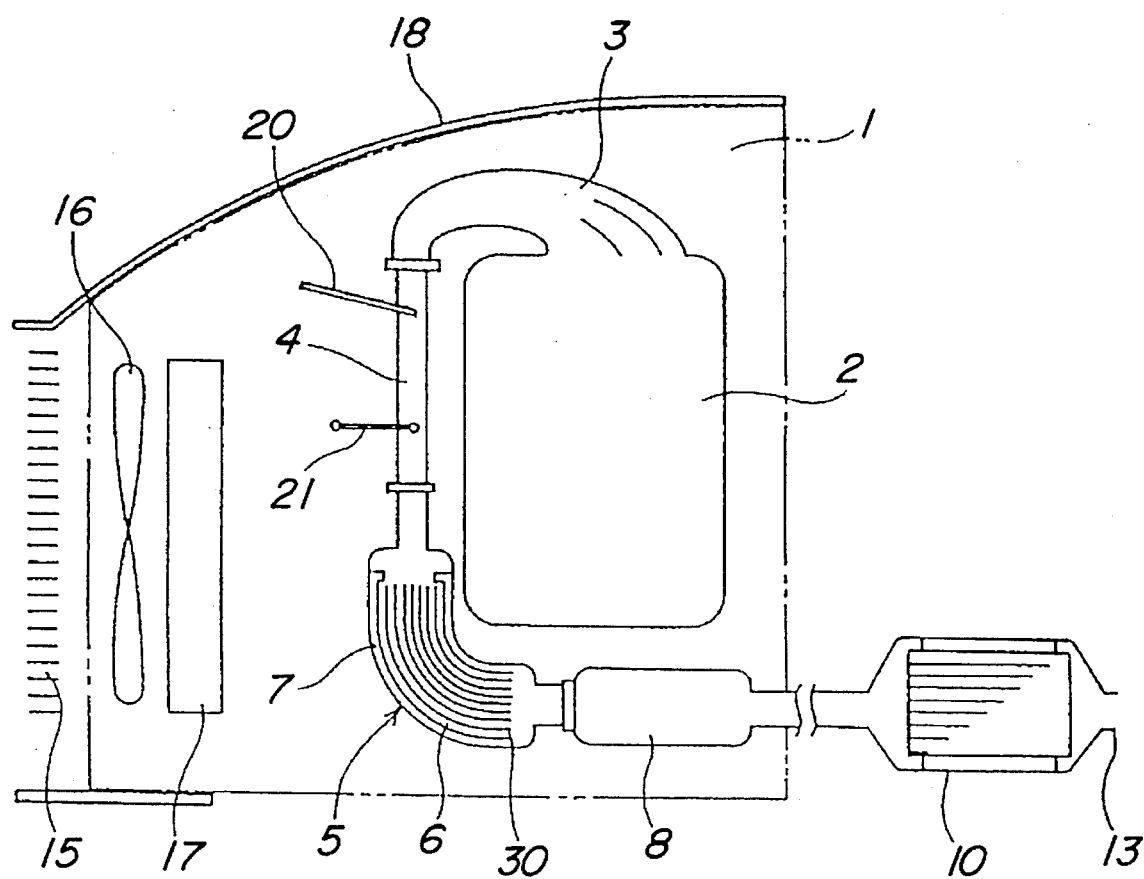
FIG. 1 is a schematic view for illustrating a state in which a honeycomb structural body according to the present invention is mounted in a catalyst unit in an engine room inside a vehicle.

In FIG. 1 is shown an example in which a curved honeycomb structural body according to the present invention is applied to a rear wheel-driven type passenger car in which an engine is mounted on a front side.

Inside an engine room 1 is mounted an engine body 2. To an exhaust manifold 3 in an exhaust system for the engine body 2 is connected an exhaust pipe 4, which is connected to an exhaust port 13 through a catalyst unit 5, a flexible joint 8, and a silencer 10 under a floor of a vehicle body. The upper portion of the engine body 2 inside the engine room 1 is covered with a bonnet 18, and a front grill 15 is formed at a front side under bonnet 18. A fan 16 and a radiator 17 are mounted on a rear side of the front grill 15. Between the exhaust manifold 3 and the catalyst unit 5 are fitted an air feed port 20 for feeding a secondary air into the exhaust pipe 4 as well as an exhaust gas temperature sensor 21.

The above catalyst unit 5 is constituted by a catalyst carrier 6 and a metallic casing 7 elastically holding the catalyst carrier 6. As shown in FIG. 1, the catalyst carrier 6 has a curved shape. This catalyst carrier 6 includes a honeycomb structural body 30 for carrying a catalyst as shown in FIG. 2 as well as a catalyst (not shown) carried onto the surface of the honeycomb structural body.

Figure 2:
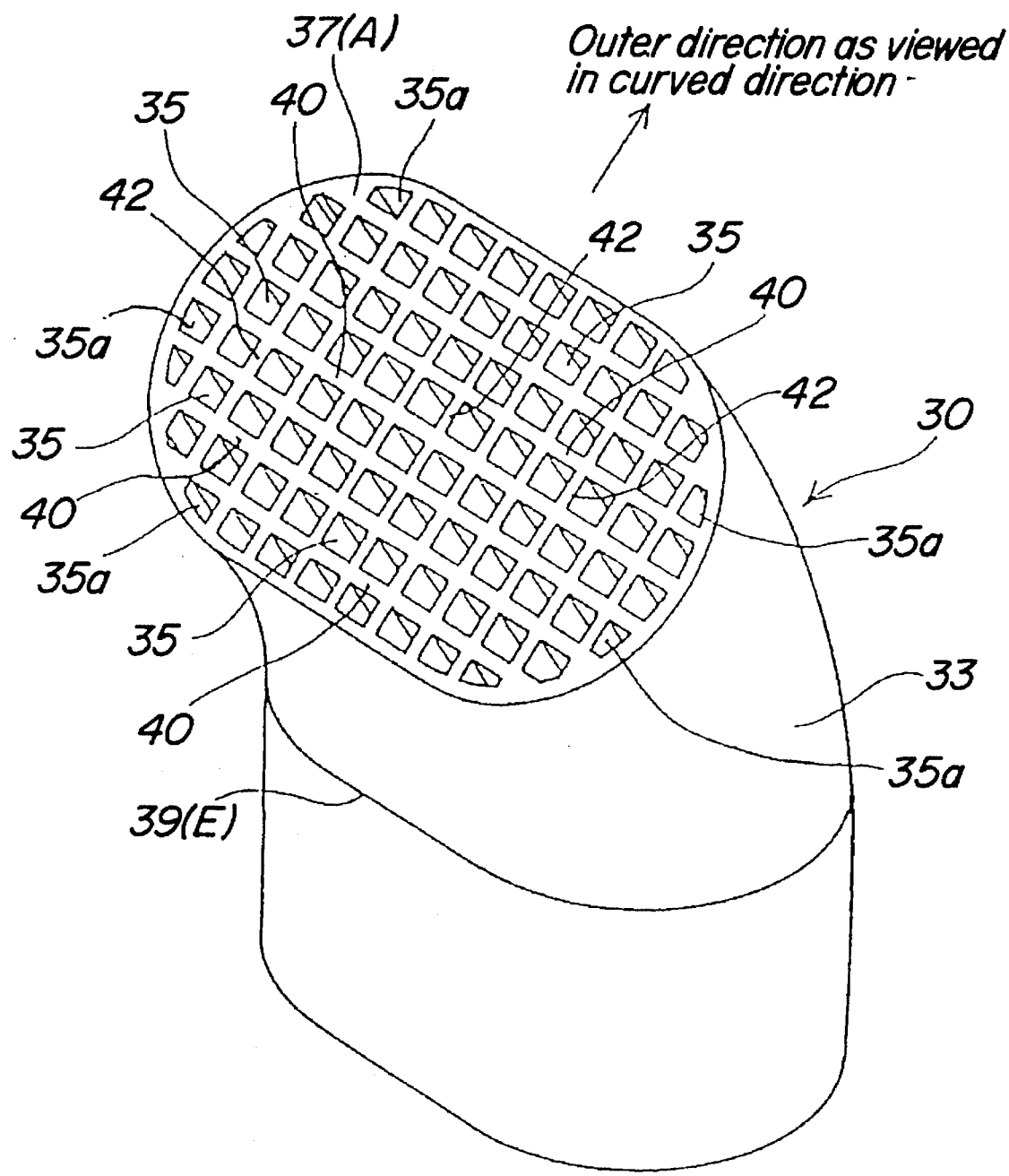
FIG. 2 is a perspective view for illustrating a first embodiment of the honeycomb structural body according to the present invention.

As shown in FIG. 2, the honeycomb structural body 30 is specifically constituted in an elliptical shape as viewed in cross section, and an elliptical-section and elongate outermost wall 33 extends along the outer periphery of the honeycomb structural body having the elliptical sectional shape. Inside the outermost wall 33 are formed a number of through holes 35 by inner walls or partition walls, which extend and communicate between one end face 37(A) to the other 39(E) substantially in parallel to a direction in which the outermost wall longitudinally extends. Curved passages are constituted along the curved shape of the honeycomb structural body by through holes 35, and the cross sectional area of every through hole 35 is substantially constant excluding those 35a located adjacent to the outermost wall 33.

A number of the through holes (curved passages) 35 are formed by inner walls 40 and inner walls 42 which extend in major and minor axes (radial) directions of the ellipse, respectively, and cross in a lattice fashion. As shown in FIG. 2, the inner walls 40 and the inner walls 42 are bent in a direction toward a central line of curving, and the curved passages 35 defined by the crossing inner walls 40 and 42 extend in parallel along the curving direction, and penetrate the honeycomb structural body from the one end face 37(A) to the other 39(E). The thickness of each of the inner walls 42 extending in the radial direction is constant (tx), and that of each of the inner walls 40 extending in the main axis direction of the ellipse is constant (ty).

If the radius R of curvature of the through hole or through holes located on the innermost side of the honeycomb structural body as viewed in a curved direction is too great, the intended advantageous merit that the honeycomb structural body can be fitted in a narrow space disappears. Thus, it is practically preferable that the radius R of curvature of the honeycomb structural body is not more than 500 mm.

Figure 3:
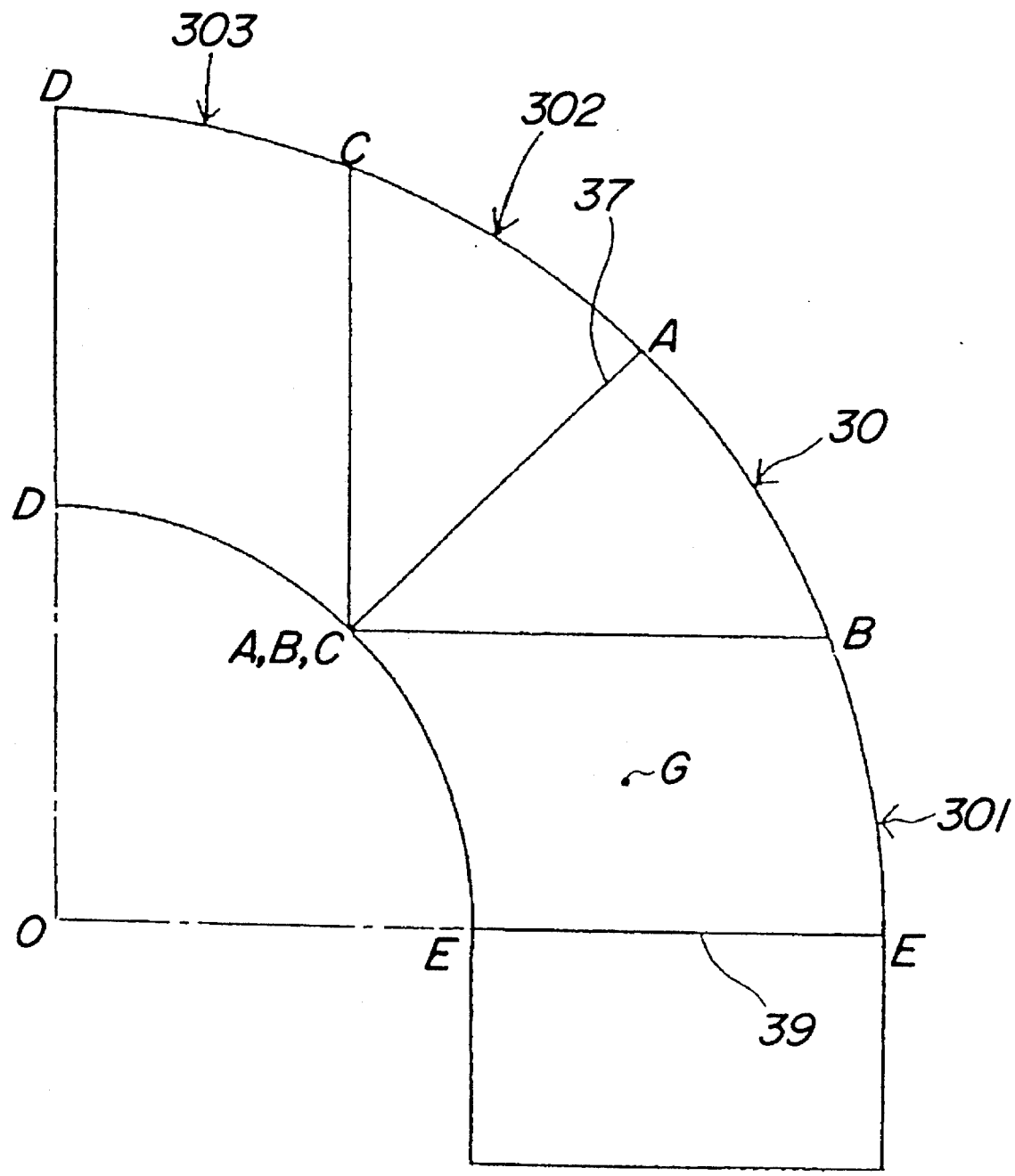
FIG. 3 is a perspective view for illustrating a variety of embodiments of the honeycomb structural bodies according to the present invention as viewed in section cut by a plane perpendicular to a line around which the honeycomb structural body is bent.

FIG. 3 schematically illustrates a variety of honeycomb structural bodies according to the present invention, in which the positions of the opposite end faces of the honeycomb structural body 30 are shown. In a first embodiment, one end face 37 is located at a section A—A, and the other 39 is at a section E—E. In the following, embodiments with an A—A end face, a B—B end face, a C—C end face or a D—D end face will be explained.

(1) A—A end face

According to the first embodiment, the honeycomb structural body 30 is circular in section around a curving center line (O), and the end faces 37 and 39 are formed with flat planes passing the center (O) (a center line) of the curving center line and crossing the through holes of the honeycomb structural body at right angles. Therefore, when the opposite ends of the through holes 35 of the honeycomb structural body 30 are to be communicated with other passages of honeycomb structural bodies, fitting of the other passages to the honeycomb structural body 30 or piping can be favorably facilitated, because the end faces 37 and 39 are orthogonal to the curved central line.

(2) B—B end face

Figure 4:
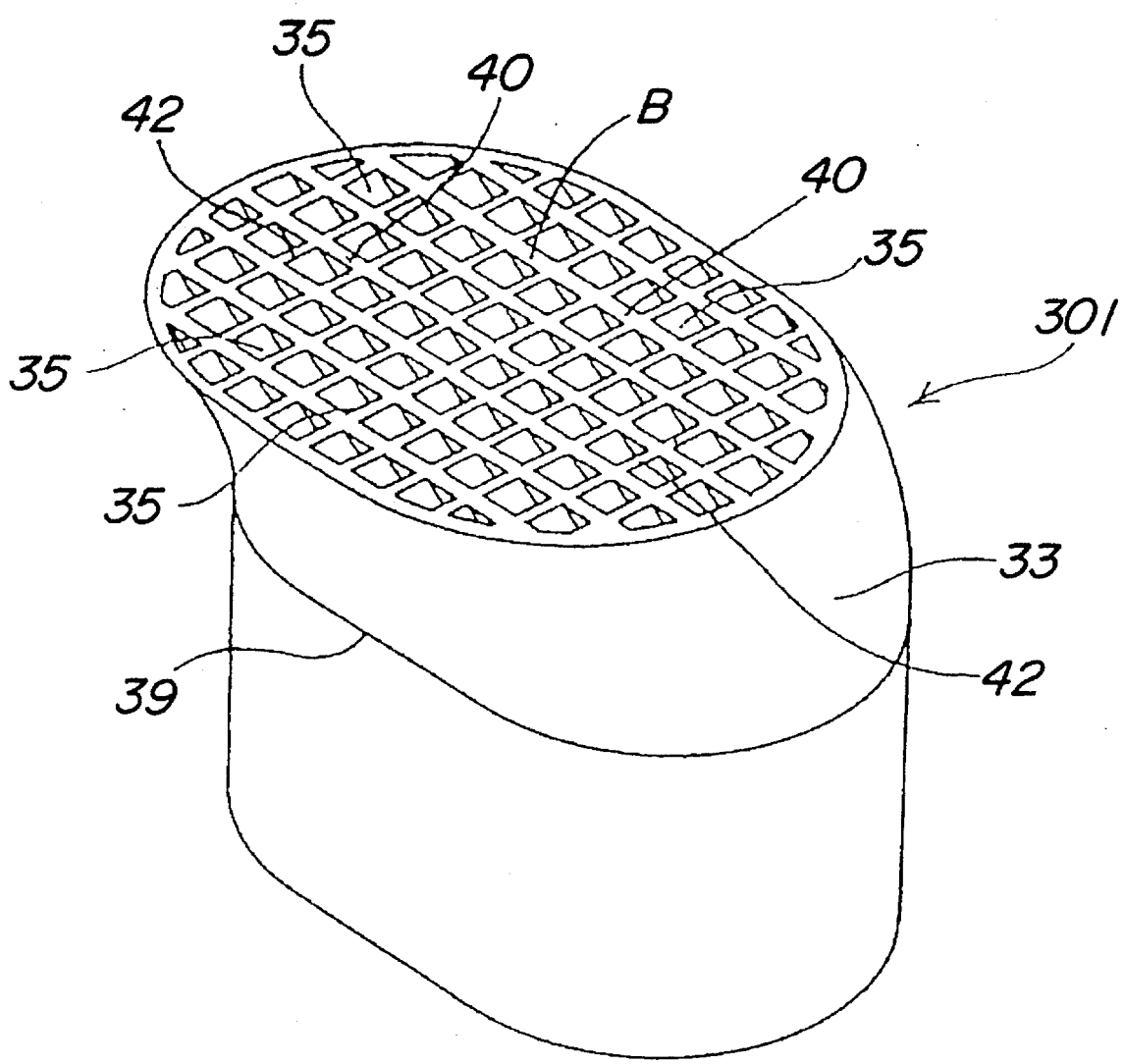
FIG. 4 is a perspective view for illustrating a honeycomb structural body with an end face at a line B—B in FIG. 3.

According to a second embodiment, a B—B end face and an E—E end face of a honeycomb structural body are parallel to a floor face as shown in FIG. 3. In this embodiment, as shown in FIG. 4, since a line perpendicularly drawn down from a centroid G of the honeycomb structural body 301 (see FIG. 3) falls in an area of the end face E—E, the honeycomb structural body 301 is stably held on the floor face in an erected state. In addition, since the end face B—B is parallel to the floor face, another honeycomb structural body having the same shape as that of the honeycomb structural body 301 can be piled upon the end face B—B of the honeycomb structural body 301 directly or indirectly through a mat.

(3) C—C end face

Figure 5:
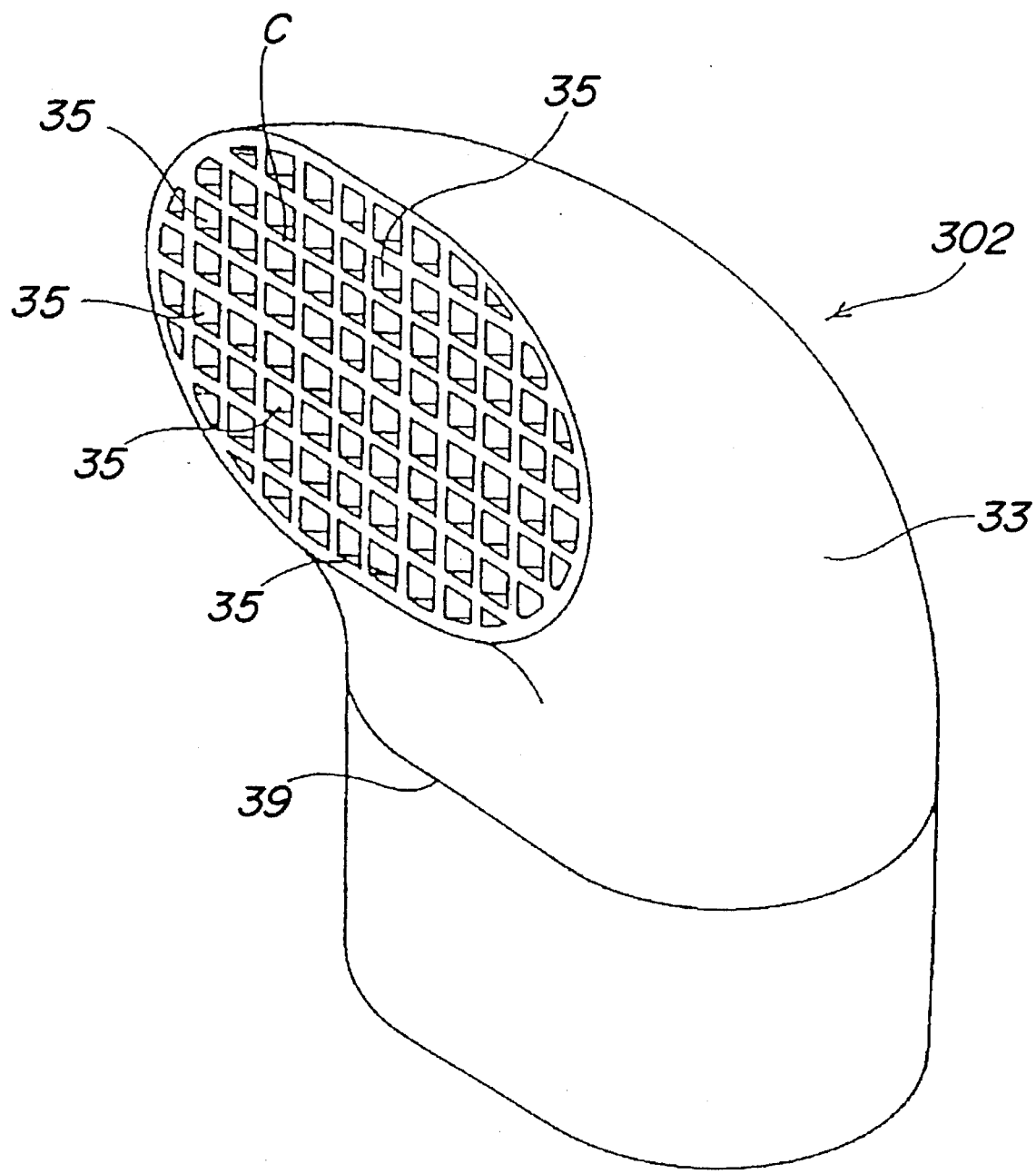
FIG. 5 is a perspective view for illustrating a honeycomb structural body with an end face at a line C—C in FIG. 3.

According to a third embodiment, as shown in FIG. 3, a C—C end face is orthogonal to an E—E end face. In this embodiment, as shown in FIG. 5, pipes can be fitted to the opposite ends of the honeycomb structural body 302 with the through holes 35 such that the pipes extends in orthogonal directions. This honeycomb structural body 302 functions as a coupling, and can be effectively utilized in a connecting portion between the orthogonal pipes, which saves installation space.

(4) D—D end face

Figure 6:
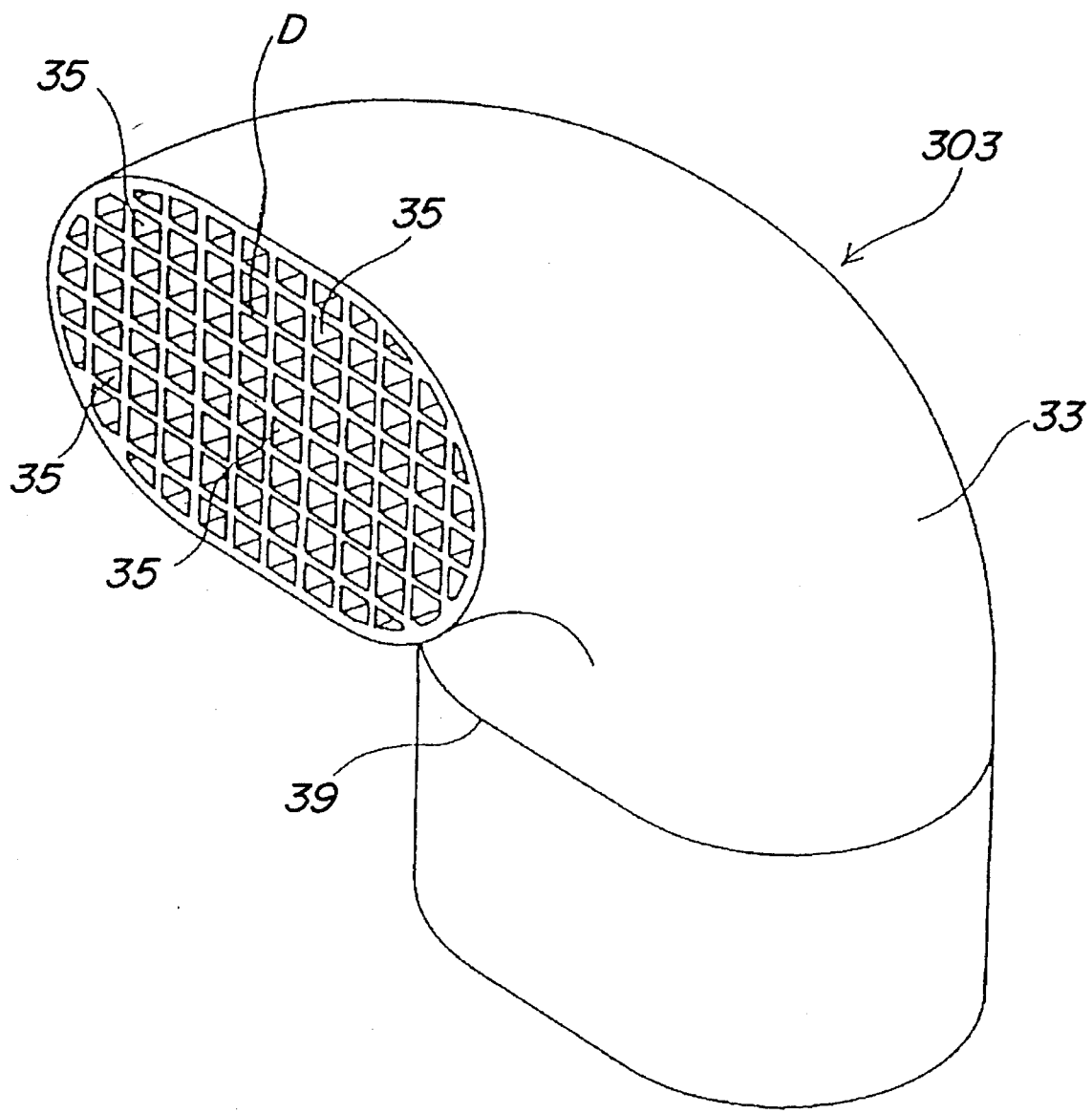
FIG. 6 is a perspective view for illustrating a honeycomb structural body with an end face at a line D—D in FIG. 3.
Figure 9A:
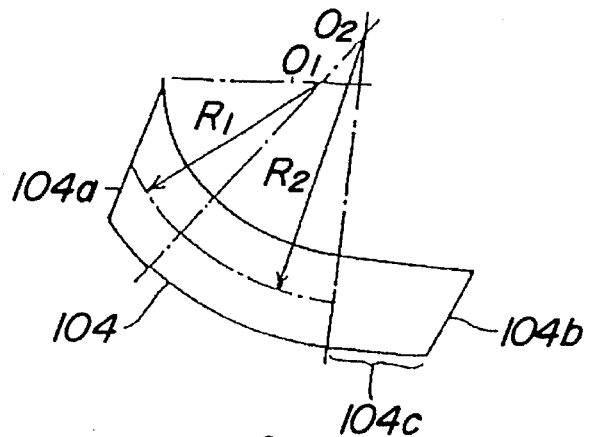
FIGS. 9(a) through 9(d) are schematic views for illustrating further variations of the shapes of the honeycomb structural bodies according to the present invention.
Figure 9B:
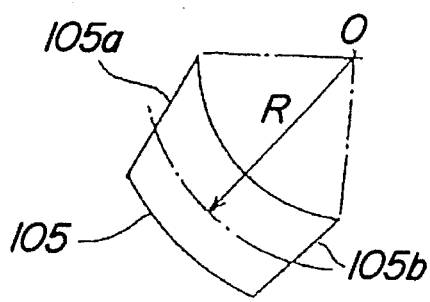
Figure 9C:
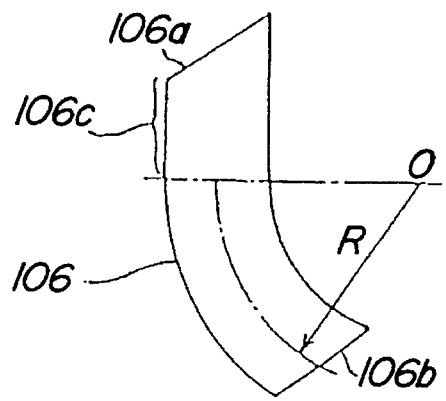
Figure 9D:
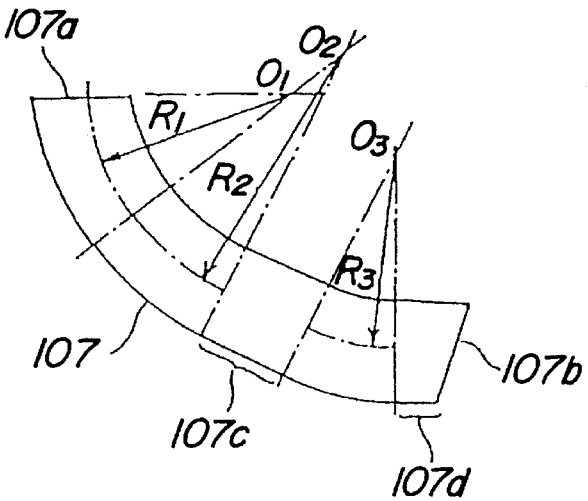

According to a fourth embodiment, as shown in FIG. 3, the honeycomb structural body 303 is curved around the curving central line (axis O) substantially in the form of one-fourth circle. In this embodiment, as shown in FIG. 6, the honeycomb structural body has a one-fourth circular form in section, so that excellent pipe-fitting performance as attained in case of the A—A end face and effective utilization in a reduced space as attained in the case of the C—C end face can be both realized.

The outer wall configuration constituting the outermost peripheral wall of the honeycomb structural body according to the present invention may have any shape. For example, a round-section pipe 52 in FIG. 7(a), a collapsed round-section pipe 54 in FIG. 7(b), an elliptical-section pipe 56 in FIG. 7(c), a square-section pipe 58 in FIG. 7(d), a rectangular-section pipe 60 in FIG. 7(e), and a triangular-section pipe 62 in FIG. 7(f) may be recited as a shape of the tubular outermost peripheral wall. As in the case with the honeycomb structural body shown in FIG. 2, a number of through holes are formed communicating between the opposite end faces of the honeycomb structural body in the case of the honeycomb structural bodies in FIGS. 7(a) through 7(f). The cross-sectional shape of the through holes is not necessarily limited to any shape, and for example, a square section, a rectangular section, a triangular section or a circular section may be employed for the shape of the through holes.

The shapes of the curved honeycomb structural bodies may be varied in various ways. For example, as shown in FIG. 8(a), the radius of curvature of a honeycomb structural body 100 is constant at R around a center O, in which the lengths of the longest and shortest through holes are set at L1 and L2, respectively. As shown in FIG. 8(b), a curved honeycomb structural body 101 may be formed by connecting two curved sections, one having a radius of curvature, $R_1$, with a center $O_1$ and the other having a radius of curvature, R2, with a center $O_2$. As shown in FIG. 8(c), a straight-line honeycomb structural body 102a may be connected to a curved honeycomb structural body 102 having a radius of curvature R. Further, as shown in FIG. 8(d), honeycomb structural bodies 103a mand 103b having different radii of curvature, R1 and R2, with centers $O_1$ and $O_2$, respectively, are connected to each other through a straight-line honeycomb structural body 103c. Furthermore, as shown in FIGS. 9(a), 9(b), 9(c) and 9(d), one or both of the opposite end faces of the honeycomb structural bodies may be inclined with respect to the extending direction of through holes (see honeycomb structural bodies 104, 105, 106 and 107 in FIGS. 9(a) through (d)). In these embodiments, the inclined end faces are indicated by 104a, 104b, 105a, 105b, 106a, 106b, 107a or 107d in FIGS. 9(a) through 9(d). In FIGS. 9(a) through (d), straight honeycomb structural bodies are denoted by 104c, 106c, 107c or 107d. With respect to the radius of curvature and the curving center in FIGS. 9(a) through 9(d), see FIGS. 8(a) through 8(d).

The honeycomb structural body according to the present invention may be produced, for example, by the following method.

That is, a honeycomb structural body is extruded by using an ordinary extruding die, and then placed on a receiving table having a curved surface with a given radius of curvature (such a curved surface may include a plurality of curved portions). Thereby, the honeycomb structural body having an intended curved shape can be obtaining by ordinary steps including firing.

In the following, experiments conducted for honeycomb structural bodies will be explained.

Experiment 1

Figure 10:
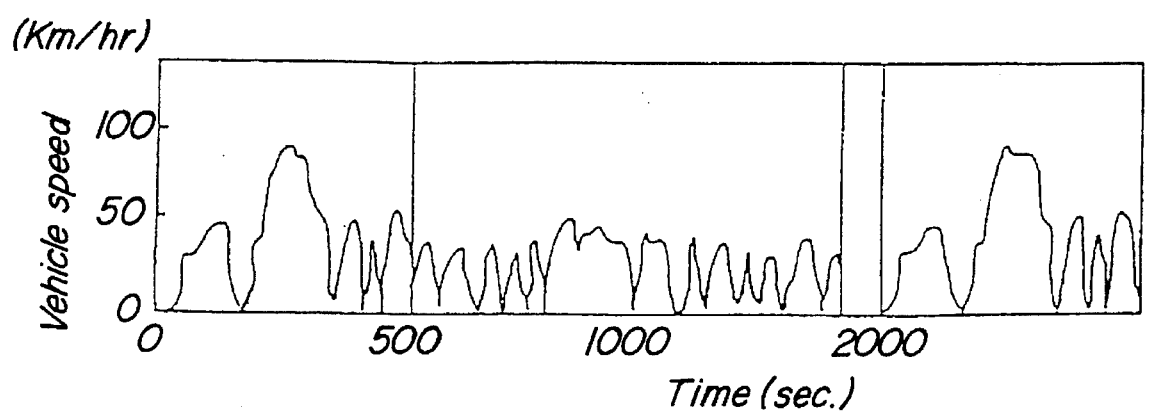
FIG. 10 is a running pattern of an automobile with an engine having a displacement of 2000 cc in Experiment 1.

A vehicle in which an engine with a displacement of 2000 cc and a honeycomb structural body as a catalyst carrier were mounted was run according to a running pattern shown in FIG. 10, and emission amounts of carbon monoxide CO, hydrocarbons HC and oxides of nitrogen NOx were measured. Results are shown in FIG. 11.

Honeycomb structural bodies made of a ceramic material and all having a volume of 1000 cc and a sectional shape shown in FIG. 8(a) were used as catalyst carriers, and platinum Pt, rhodium Rh or paradium Pd was employed as a carried noble metal at an equal carried amount $1.4 \times 10^{-3}$ g/cm$^3$. The outer wall constituting the outermost peripheral wall orthogonal to the extending direction of the through holes had an elliptical shape having a minor axis of 75 mm and a major axis of 100 mm, and the cross-sectional shape of the through holes was square. The number of the through holes was 60/cm$^2$ in a plane orthogonal to the passing direction of the through holes. The thickness of the walls between the adjacent through holes was 0.15 mm.

Figure 11:
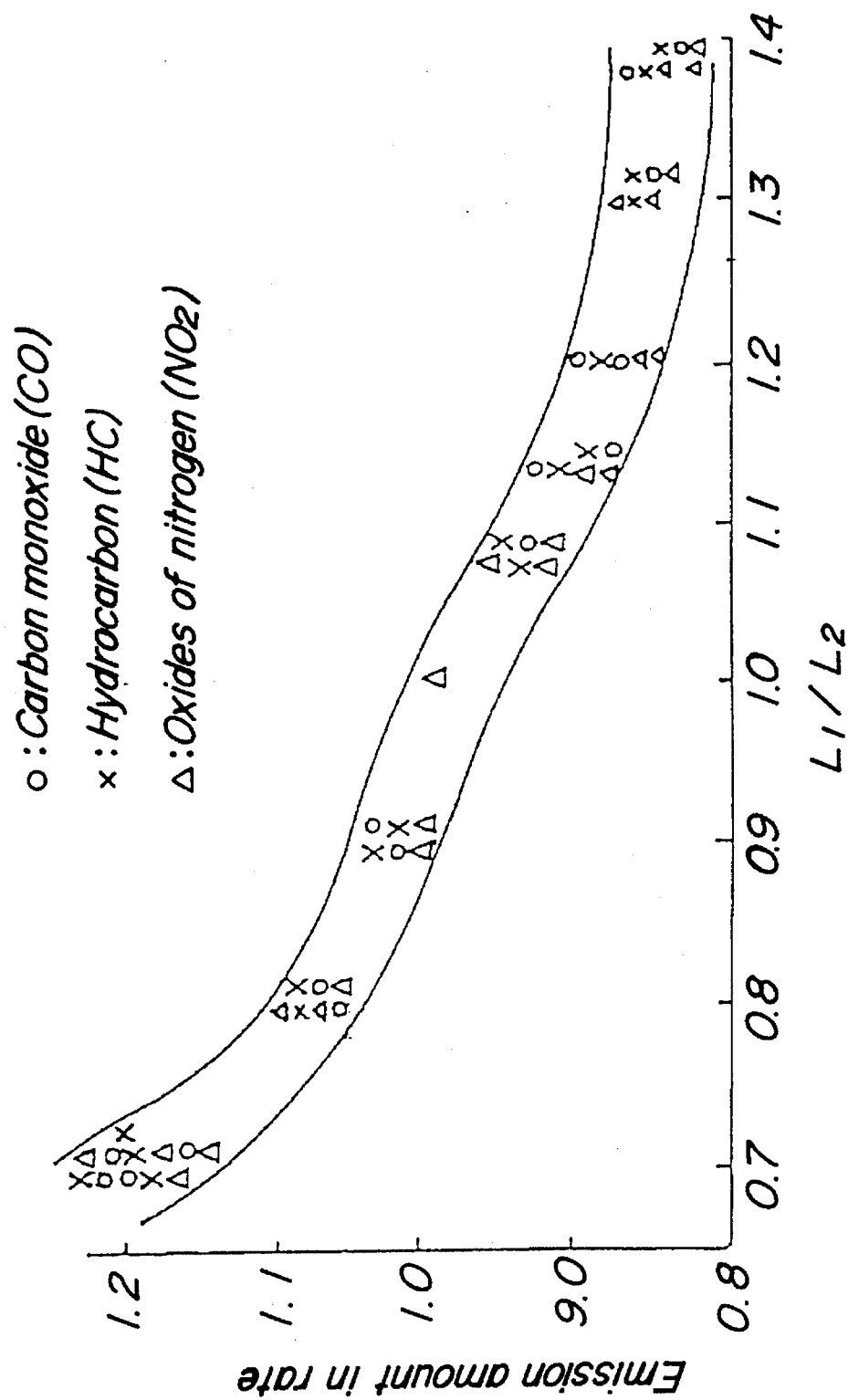
FIG. 11 is a characteristic graph showing the relation between emission amounts of CO, HC and NOx in Experiment 1 of the present invention and the ratio L1/L2 in length of the longest through hole and the shortest through hole.

FIG. 11 shows experimental results, while the discharge amount of each of CO, HC and NOx in the case of a conventional honeycomb structural body (that is, L1/L2=1) is taken as 1. When L1/L2 was not less than 0.8, the discharge amounts of CO, HC and NOx did not conspicuously decrease. When L1/L2 was not less than 1.2, the discharge amount of each of CO, HC and NOx decreased by not less than 10% as compared with the conventional case. Accordingly, L1/L2 is required to be not less than 0.8, and preferably not less than 1.0, and more preferably not less than 1.2.

Experiment 2

An automobile engine having a displacement of 2000 cc was used, and a honeycomb structural body was fitted midway an exhaust pipe. The pressure loss of the honeycomb structural body was determined based on a difference in pressure between upstream and downstream the honeycomb structural body when the engine was operated at 40 km/hr. Results are shown in FIG. 12.

The honeycomb structural bodies used were made of a ceramic material (cordierite), and had shapes shown in FIGS. 9(a), 9(b), 9(c) or 9(d). The volume of every honeycomb structural body was 1800 cc. The outer wall constituted by the outermost peripheral wall had a circular shape with a diameter of 100 mm as viewed in a plane orthogonal to the through holes. The through holes had a square cross-sectional shape, and the number of the through holes was 90/cm$^2$ as viewed in a plane orthogonal to the through holes. The thickness of the walls between the adjacent through holes was 0.1 mm.

Figure 12:
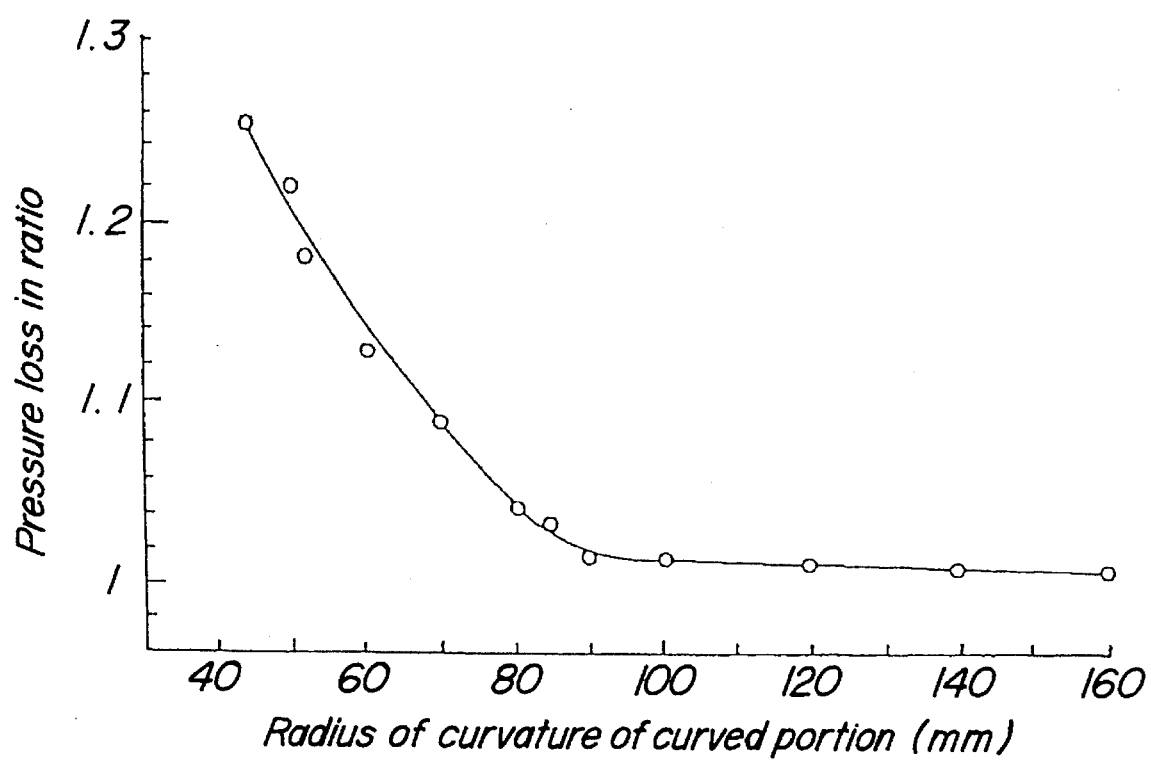
FIG. 12 is a characteristic diagram showing the relation between the pressure loss and the radius of the curvature of the curved honeycomb structural body.

FIG. 12 shows results of the relationship between the radius of curvature and the pressure loss, while the pressure loss of the conventional honeycomb structural body was taken as 1. It is seen that when the radius of curvature exceeds 100 mm, the pressure loss conspicuously decreases.

According to the above curved honeycomb structural bodies, as compared with the conventional straight-line honeycomb structural bodies, since the honeycomb structural bodies are curved, the honeycomb structural bodies can be each arranged by effectively utilizing a narrow empty portion of a space.

Further, when the honeycomb structural body according to the present invention is used to carry a catalyst, the catalyst unit can be arranged by effectively utilizing a narrow space at a corner portion around an engine inside an engine room, which enhances the catalytic function for the engine, saves the installation space in the engine room, reduce the weight of the constituent parts in the engine room, and effectively utilizes the space in the vehicle.

As having been explained above, according to the curved honeycomb structural bodies of the present invention, since the outer peripheral wall of the honeycomb structural body is curved, the honeycomb structural body can be excellently fitted in curved space or a curved corner portion, which has not been attained in the conventional straight-line honeycomb structural bodies.

Furthermore, according to the honeycomb structural body of the present invention, when the structural body is used as the catalyst carrier, an empty space inside the automobile engine room in which the engine is mounted can be utilized as effectively as possible, and further integration of engine parts inside the engine room can be realized.

We claim:

1. A honeycomb structural body including an outermost peripheral wall, and partition walls by which a number of through holes extending in an axial direction of the honeycomb structural body are defined inside the outermost peripheral wall, said honeycomb structural body being bent around at least one line located in a direction orthogonal to an extending direction of said through holes and perpendicular to a first plane passing a center line of the honeycomb structural body, said center line being defined by continuously connecting centroids of said outermost peripheral wall of the honeycomb structural body in respective planes orthogonal to the extending direction of the through holes thereof, wherein L1/L2 is no less than 0.8, and R is not less than 100 mm, in which L1 is an axial length of a longest through hole among through holes located in an outer portion of the honeycomb structural body, L2 is an axial length of a shortest through hole among through holes located in an inner portion of the honeycomb structural body, said axial length of the through hole being a length of the through hole as measured along a longitudinal center line thereof, and R is a radius of curvature of said center line of the honeycomb structural body, said outer and inner portions of the honeycomb structural body being located outside and inside a second plane, respectively, said second plane passing said center line of the honeycomb structural body and always extending in parallel to said at least one line around which the honeycomb structural body is bent and perpendicular to said first plane.

2. The honeycomb structural body set forth in claim 1, wherein the center line possesses at least two different radii R of curvature.

3. The honeycomb structural body set forth in claim 2, wherein centers of curves bent at at least two different radii R of curvature are located on the same side of the honeycomb structural body.

4. The honeycomb structural body set forth in claim 1, further comprising a straight-line portion in which said through holes are not bent at at least one of an end portion of the honeycomb structural body and at a portion other than said end portion.

5. The honeycomb structural body set forth in claim 4, which is made of a ceramic material.

6. The honeycomb structural body set forth in claim 4, wherein a catalyst is carried on inner walls defining the through holes.

7. The honeycomb structural body set forth in claim 1, which is made of a ceramic material.

8. The honeycomb structural body set forth in claim 7, wherein a catalyst is carried on inner walls defining the through holes.

9. The honeycomb structural body set forth in claim 4, wherein a catalyst is carried on inner walls defining the through holes.

10. The honeycomb structural body set forth in claim 1, wherein said partition walls extend in orthogonal directions as viewed in section at right angles to said extending direction of said through holes, thereby defining two orthogonal axes as viewed in said section, and said at least one line is parallel to one of said two orthogonal axes.

11. The honeycomb structural body set forth in claim 1, wherein a sectional shape of the honeycomb structural body as viewed in section orthogonal to said extending direction of the through holes is one selected from the group consisting of a circular shape, an elliptical shape, an oval shape, a square shape, a rectangular shape and a triangular shape.

* * * * *

UNITED STATES PATENT AND TRADEMARK OFFICE
CERTIFICATE OF CORRECTION

PATENT NO. : 5,455,097
DATED : October 3, 1995
INVENTOR(S) : Minoru MACHIDA; Masaomi KAMIYA; Toshio YAMADA It is certified that error appears in the above-indentified patent and that said Letters Patent is hereby corrected as shown below:

On the title page: Item [54] and Column 1, line 1, change "STUCTURAL" to --STRUCTURAL--.

Signed and Sealed this

Sixteenth Day of January, 1996

Attest:

BRUCE LEHMAN

Attesting Officer     Commissioner of Patents and Trademarks